(12) United States Patent
Mongan et al.

(10) Patent No.: US 8,204,561 B2
(45) Date of Patent: Jun. 19, 2012

(54) ONE PIECE CO-FORMED EXTERIOR HARD SHELL CASE WITH AN ELASTOMERIC LINER FOR MOBILE ELECTRONIC DEVICES

(75) Inventors: Ryan Hill Mongan, Orange, CA (US); David John Law, Seattle, WA (US); Jarret Weis, San Francisco, CA (US); Bryan Lee Hynecek, Fremont, CA (US); Stephen Reiger Myers, Redwood City, CA (US)

(73) Assignee: Speculative Product Design, LLC, Palo Alto, CA (US)

( * ) Notice: Subject to any disclaimer, the term of this patent is extended or adjusted under 35 U.S.C. 154(b) by 0 days.

(21) Appl. No.: 13/282,363

(22) Filed: Oct. 26, 2011

(65) Prior Publication Data

US 2012/0031788 A1      Feb. 9, 2012

Related U.S. Application Data

(63) Continuation of application No. 12/366,769, filed on Feb. 6, 2009.

(51) Int. Cl.
*H05K 7/00*     (2006.01)

(52) U.S. Cl. ................ 455/575.8; 206/592; 361/679.55; 361/679.56; 455/575.1

(58) Field of Classification Search ......................... None
See application file for complete search history.

(56) References Cited

U.S. PATENT DOCUMENTS

| | | | |
|---|---|---|---|
| 5,265,720 A | 11/1993 | Meliconi | |
| 5,816,459 A | 10/1998 | Armistead | |
| 5,908,114 A | 6/1999 | Althouse et al. | |
| 6,079,563 A | 6/2000 | Katchmazenski | |
| 6,109,434 A | 8/2000 | Howard, Jr. | |
| 6,179,122 B1 | 1/2001 | Moncrief et al. | |

(Continued)

FOREIGN PATENT DOCUMENTS

GB      2463712 A      3/2010

(Continued)

OTHER PUBLICATIONS

Video Product Review: iPhone 3G Case Review: iFrogz Luxe URL: http://www.youtube.com/watch?v=cENH2uYzqLk Date Published: Jan. 26, 2009 Uploaded by phonedog on Jan. 26, 2009, 1pg.

(Continued)

*Primary Examiner* — Rafael Pérez-Gutiérrez
*Assistant Examiner* — Daniel Nobile
(74) *Attorney, Agent, or Firm* — SNR Denton US LLP

(57) ABSTRACT

A one-piece co-formed exterior hard shell case with an elastomeric liner formed on the interior of the exterior hard shell for mobile electronic devices. This hard protective exterior shell allows the device maximum protection from impacts with sharp objects while the interior elastomeric portion that provides shock protection for the device from impacts. The exterior hard shell part is formed to fit the device closely with a small offset from the devices surface. The exterior hard shell raps around the edges of the device. To allow the shell to be able to be mounted on the device the corners of the hard shell are cut open. This allows each sidewall to flex away when a device is inserted and snap back once it is in place. The elastomeric material fills in the gaps created at the corners of the exterior hard shell to allow flex for mounting.

16 Claims, 6 Drawing Sheets

U.S. PATENT DOCUMENTS

| | | |
|---|---|---|
| 6,273,252 B1 | 8/2001 | Mitchell |
| 6,471,056 B1 | 10/2002 | Tzeng |
| 6,614,722 B2 | 9/2003 | Polany et al. |
| 6,665,174 B1 | 12/2003 | Derr et al. |
| 6,785,566 B1 | 8/2004 | Irizarry |
| 6,914,774 B1 | 7/2005 | Albertini et al. |
| 6,980,777 B2 | 12/2005 | Shepherd et al. |
| 6,981,589 B1 | 1/2006 | Sanders, Jr. |
| 7,248,904 B2 | 7/2007 | Gartrell et al. |
| 7,343,184 B2 | 3/2008 | Rostami |
| 7,495,895 B2 | 2/2009 | Carnevali |
| D593,319 S | 6/2009 | Richardson et al. |
| D593,746 S | 6/2009 | Richardson et al. |
| 7,551,949 B2 | 6/2009 | Schworm |
| 7,609,512 B2 | 10/2009 | Richardson |
| 7,623,898 B2 | 11/2009 | Holmberg |
| 7,647,082 B2 | 1/2010 | Holmberg |
| D617,784 S | 6/2010 | Richardson et al. |
| 7,933,122 B2 | 4/2011 | Richardson et al. |
| 2001/0002003 A1 | 5/2001 | Muzdak |
| 2003/0036362 A1 | 2/2003 | Buesseler et al. |
| 2003/0068035 A1 | 4/2003 | Pirila et al. |
| 2003/0070959 A1 | 4/2003 | Maresh et al. |
| 2003/0083094 A1 | 5/2003 | Hsu et al. |
| 2003/0103624 A1 | 6/2003 | Hu |
| 2003/0111366 A1 | 6/2003 | Enners |
| 2004/0014506 A1 | 1/2004 | Kemppinen |
| 2005/0153757 A1 | 7/2005 | Maenpaa et al. |
| 2005/0174727 A1 | 8/2005 | Thomas et al. |
| 2005/0279661 A1 | 12/2005 | Hodges |
| 2006/0040550 A1 | 2/2006 | Slauson et al. |
| 2006/0164800 A1 | 7/2006 | McEwan et al. |
| 2007/0060224 A1 | 3/2007 | Liu |
| 2007/0184781 A1 | 8/2007 | Huskinson |
| 2008/0032758 A1 | 2/2008 | Rostami |
| 2008/0039161 A1* | 2/2008 | Chan .................... 455/575.8 |
| 2008/0096620 A1* | 4/2008 | Lee et al. ............... 455/575.8 |
| 2008/0227507 A1 | 9/2008 | Joo |
| 2008/0242384 A1 | 10/2008 | Hsu et al. |
| 2009/0017883 A1 | 1/2009 | Lin |
| 2009/0080153 A1 | 3/2009 | Richardson et al. |
| 2009/0111543 A1 | 4/2009 | Tai |
| 2009/0194444 A1 | 8/2009 | Jones |
| 2010/0006314 A1 | 1/2010 | Wilson, II et al. |
| 2010/0078343 A1 | 4/2010 | Hoellwarth et al. |
| 2010/0096284 A1 | 4/2010 | Bau |
| 2010/0104814 A1 | 4/2010 | Richardson et al. |
| 2010/0116387 A1 | 5/2010 | Channey et al. |
| 2010/0144411 A1 | 6/2010 | Pettingill |
| 2010/0147715 A1 | 6/2010 | Miglioli et al. |
| 2010/0243515 A1 | 9/2010 | Mish et al. |

FOREIGN PATENT DOCUMENTS

| | | |
|---|---|---|
| WO | 02/11161 A1 | 2/2002 |

OTHER PUBLICATIONS

Shock protection of portable electronic products: Shock response spectrum, damage boundary approach, and beyond Goyal, S. (Reprint); Papadopoulos, JM; Sullivan, PA AT&T Bell Labs, Lucent Technol, Wireless Res Lab, 600 Mt Ave, Rm 1b-212, Murray Hill, NJ, 07974 (Reprint) Shock and Vibration, 1997, vol. 4, No. 3, p. 169-191.

Improving impact tolerance of portable electronic products: Case study of cellular phones S. Goyal, S. Upasani and D.M. Patel Experimental Mechanics Cover Date: Mar. 18, 1999 Publisher: Springer Boston ISSN: 0014-4851 Subject: Engineering Start p. 43 End p. 52 vol. 39 Issue: 1 URL: http://dx.doi.org/10.1007/BF02329300 DOI: 10.1007/BF02329300; 10 pp.

CandyShell Source: http://web.archive.org/web/20081218035309/http://www.speckproducts.com/products/candyshell/iphone-3g/162, Dec. 18, 2008, 3 pp.

Role of shock response spectrum in electronic product suspension design Goyal, S., Elko, Gary W., Buratynski, Edward K. The International Journal of Microcircuits and Electronic Packaging. vol. 23, No. 2, Second Quarter, 2000, pp. 182-190 ISSN: 1063-1674 Source: http://www.imaps.org/journal/2000/Q2/goyal.pdf, 9pp.

Designing best-in-class impact-tolerant cellular phones and other portable products Goyal, S., Upasani, Sanjay S., Patel, Dhiren M. Bell Labs Technical Journal. vol. 3, No. 3, 1998, pp. 159-174 DOI: 10.1002/bltj.2123 Source: http://dx.doi.org/10.1002/bltj.2123, 24 pp.

iPhone Case Review Roundup: Vaja, Sena, OtterBox, DLO and Boxwave Source: http://www.mobiletechreview.com/iPod/iPhone-cases-review.htm Accessed: Sep. 27, 2011, 8pp.

CapsuleRebel™ for iPhone 3G Source: http://web.archive.org/web/20081225012114/http://www.switcheasy.com/products/Rebel/Rebel.php, Dec. 25, 2008, 3pp.

CapsuleNeo™ for iPhone 3G Source: http://web.archive.org/web/20081222050045/http://www.switcheasy.com/products/Neo/Neo.php; Dec. 22, 2008, 4pp.

Speck CandyShell for iPhone 3G Source: http://web.archive.org/web/20090119211235/http://ilounge.com/index.php/reviews/entry/speck-candyshell-for-iphone-3g; Jan. 16, 2009, 7pp.

Speck; PCT/US2010/022330 filed Jan. 28, 2010; International Search Report, ISA/US; Mar. 31, 2010, 3 pp.

\* cited by examiner

ONE PIECE CO-FORMED EXTERIOR HARD SHELL CASE WITH AN ELASTOMERIC LINER FOR MOBILE ELECTRONIC DEVICES

RELATED APPLICATIONS

This application is a CONTINUATION of U.S. patent application Ser. No. 12/366,769, filed Feb. 6, 2009, the contents of which is incorporated herein by reference.

TECHNICAL FIELD OF THE INVENTION

The present invention relates generally to handheld mobile electronic devices, such as a personal digital assistant, cellular telephone, lab top computers or portable digital media player. More specifically the present invention relates to a multiple-component protective case for mobile electronic devices.

BACKGROUND OF THE INVENTION

There are many cases for handheld electronic devices. They fall into four main categories: Elastomeric/Rubber skins, hard plastic shells, cut and sew materials and combinations of these. In general the elastomeric cases are a single skin which, because of the flexible nature of the material, can easily be stretched over the device and then once installed conform closely to the shape of the device. The rubbery material can provide very good shock resistance. The downside of these types of cases is that the elastomeric material has a high surface friction coefficient. This makes this type of case difficult to place in and remove from pockets and other tight places. What is needed is a device that offers the very good shock resistance of an elastomeric case without the high surface friction coefficient making it more convenience for use.

Hard plastic shells normally are manufactured as more than one piece to allow the device to slide into the case before being closed in with a secondary piece. Additionally they will often have a liner of elastomeric material, which helps to cushion the device. This can be co-molded, permanently attached or floating with the assembly. Cut and Sew cases are normally made from flat stock material, which is cut into patterns and then sewn into a shape that the device can slide into. The device is then held in place, by friction or a strap of some form. The downside to these devices is that it can be difficult to attached a device to a rigid case, or where a case has a secondary piece for securing a device, it can add bulk to the combination of the device and case, making it impractical. Additionally, the manufacture of cases which are required to be cut and sewn together greatly increases cost. What is needed is a case that combines both hard shell cases and elastomeric materials that is easy to produce and requires minimal material in its production.

SUMMARY OF THE INVENTION

The present invention is an improvement over the existing cases because it combines the best features of both hard cases and the elastomeric cases while being only a single part, which is particularly useful from a consumer viewpoint. The present invention provides a hard protective exterior shell. This hard protective exterior shell allows the device maximum protection from impacts with sharp objects. The hard protective exterior shell mimics the finish of existing phones, MP3/4 players, and other mobile electronic devices. Many users like the feel of the original phone and would like to maintain that feel but still want protection for their device. The hard protective exterior shell of the present invention has a low coefficient of friction. This allows the device to easily be slipped in and out of pockets easily without becoming attached or without great resistance to clothing materials. A major complaint from current elastomeric case users.

The case taught by the present invention has an interior elastomeric portion that provides shock protection for the device from dropping, falls, or other impacts. The interior elastomeric portion also ensures the device and the case fit together with no gaps as the case is a single piece assembly. The case has a very solid connection to the phone and feels extremely high quality and lightweight.

What makes this case different is the geometry and manufacturing of the case. The exterior hard shell part is formed to fit the device closely with a small offset from the devices surface. The exterior hard shell raps around the edges of the device it is formed for. To allow the shell to be able to be mounted on the device the corners of the hard shell are cut open. This allows each sidewall to flex away when a device is inserted and snap back once it is in place. The unique aspect of this case is that the elastomeric material is formed in addition to the exterior hard shell on the interior of the exterior hard shell. The elastomeric material fills in the gaps created at the corners of the exterior hard shell to allow the hard shell to flex for mounting. The elastomeric material is provided in this location because it has much greater inherent flexibility than the plastic or metal of the exterior hard shell and it stretches sufficiently to allow the sidewalls of the exterior hard shell to still flex away on mounting. This creates a one-piece case that wraps around a phone or other mobile electronic device even on corners and prevents dirt and fluids from entering wherever possible. The elastomeric liner also can be formed over the buttons on the phone wherein a user simply presses the elastomeric liner corresponding to the portion of the mobile electronic device input that is desired.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
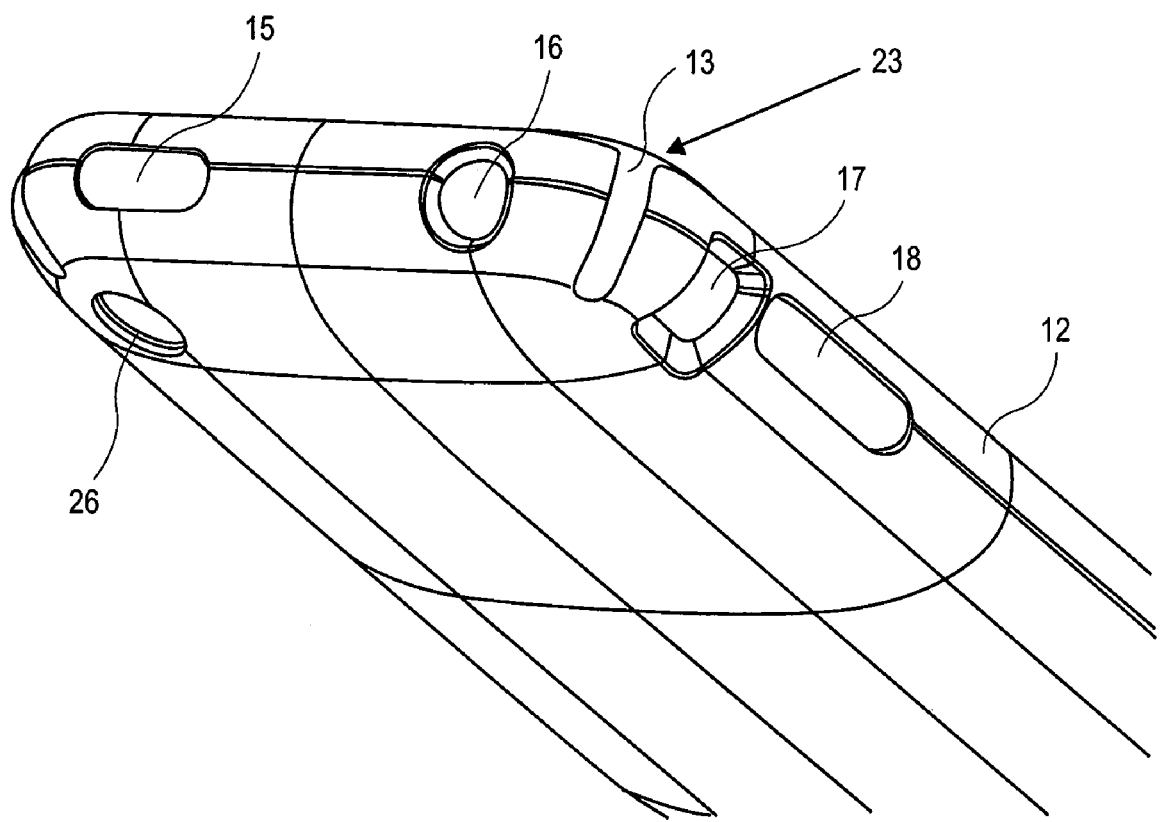
FIG. 1 is a perspective view of a handheld device protective case depicting the external hard shell layer with cut corners and inner elastomeric layer of the protective carrying case where it fills in the cut corners of the external hard shell layer.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is therefore, not to be taken in a limiting sense, and the scope of the present invention is defined only by the appended claims.

The invention will now be described with reference to FIG. 1, which is a perspective view of the protective case 10 depicting the outer layer of the protective case 11, comprising two separate layers, an first external hard shell layer 12 and a second interior elastomeric layer 13. The first external hard shell layer 12 and a second interior elastomeric layer 13 are combined to independently attach to a handheld device 19 and incorporate at least one viewing window 14, input/output access ports 15, 16, and 17, and molded elastomeric covers over device buttons, accessible though holes in the hard shell 18 and 26. This hard protective exterior shell 12 allows the device maximum protection from impacts with sharp objects. The external hard shell layer 12 mimics the finish of existing phones, MP3/4 players, and other mobile electronic devices. Many users like the feel of the original phone and would like to maintain that feel but still want protection for their device 19. The external hard shell layer 12 of the present invention has a low coefficient of friction. This allows the device to easily be slipped in and out of pockets easily without becoming attached or without great resistance to clothing materials.

With further reference to FIG. 1, the external hard shell layer 12 is attached to the second interior elastomeric layer 13. The external hard shell layer 12 and the interior elastomeric layer 13 may be attached in several ways, such as glue, chemical bonding, heating, heat treated chemicals or any other means know in the art which permanently attach the external hard shell layer 12 to the interior elastomeric layer 13. The interior elastomeric portion 13 provides shock protection for the device from dropping, falls, or other impacts. The interior elastomeric portion 13 also ensures the device 19 and the protective case 10 fit together with no gaps as the protective case 10 is a single piece assembly. The protective case has a very solid connection to a device 19 and feels extremely high quality and lightweight.

Depending on manufacturing methods other materials made be used to replace the hard plastic used by the external hard shell layer 12 in a preferred embodiment of the present invention. For example, if it was desired to make a metal/elastomeric combo for the protective case 10 without overhangs in the hard material, in this example metal, a simple bending process could be considered for the metal manufacturing. An over molded interior elastomeric layer 13 would provide the undercuts to secure a device. The metal or hard 10 material would then simply provide a framework for the softer material interior layer and also provide the elastic stiffness to allow the device to be held in the opening. The undercut would be formed in the elastomeric material but the flexing to allow a device to be inserted into the protective case would come from the harder material, and again, cutting away the corners of the case allows the sides to easily flex.

Figure 2A:
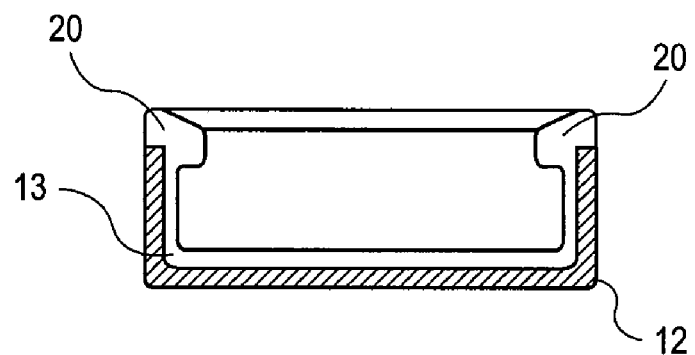
FIGS. 2a and 2b are sectional views of the protective case of the present invention showing the detent created by the inner elastomeric layer for securing a device in the case.
Figure 6:
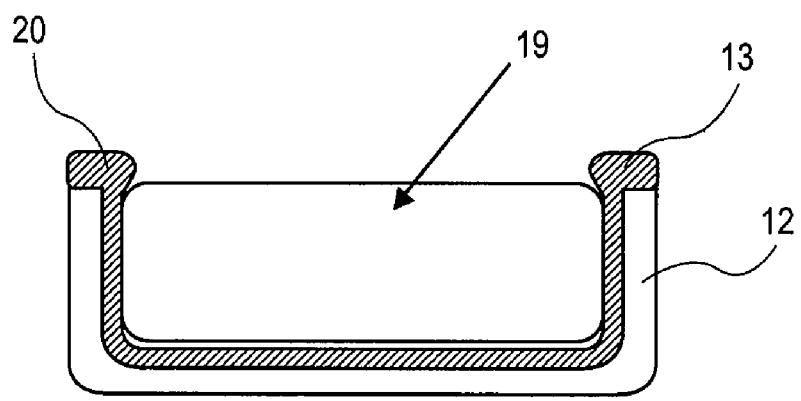
FIG. 6 is a perspective view of the protective case attached to a sample device showing the detent created by the inner elastomeric layer for securing a device in the case.

FIGS. 2a and 6 are sectional views of the protective case 10 of the present invention showing the detent 20 created by the inner elastomeric layer 13 for securing a device 19 in the case. The protective case 10 is fitted to clasp onto a device 19, and incorporates a detent 20 to ensure a snug and secure fit.

Figure 2B:
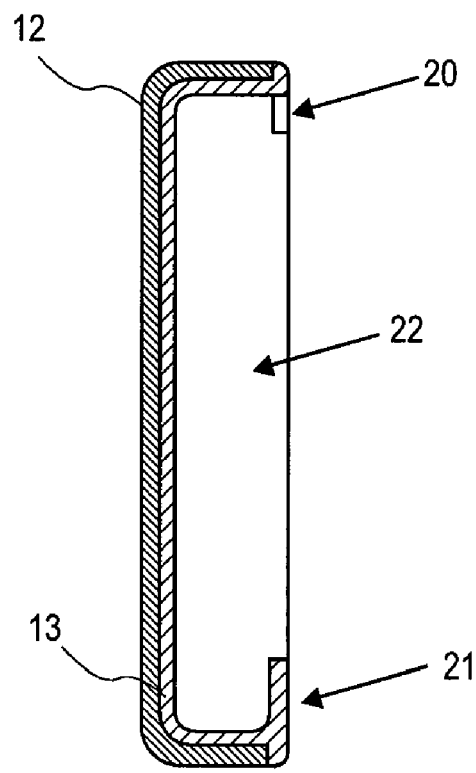
Figure 4:
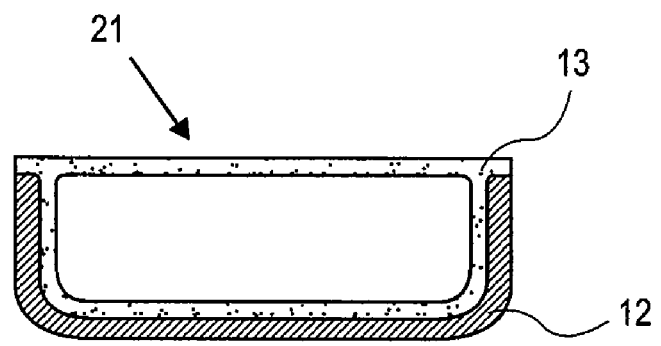
FIG. 4 is sectional view of the protective case of the present invention showing the large elastomeric overhand for securing a device.

In an alternative embodiment as shown in FIGS. 2b and 4, an additional large elastomeric overhang 21 for securing a device 19 may be included in the protective case 10. This illustrates a possible alternative embodiment where rather than having an undercut in the external hard shell layer 13 and its corresponding sides of the protective case 10, the inner elastomeric layer 13 forms features that would secure the protective case to a device 19.

These features could be detents 20 as described along the side or top and bottom of the external hard shell layer 12 or it could be a large area like illustrated in FIGS. 2b and 4 where an additional large elastomeric overhang 21 for securing a device 19 may be included in the protective case 10 so that a device would be slipped under and secured thereby with some form of undercut on the opposite end whether molded into the external hard shell layer 12 or the inner elastomeric layer 13.

Figure 3:
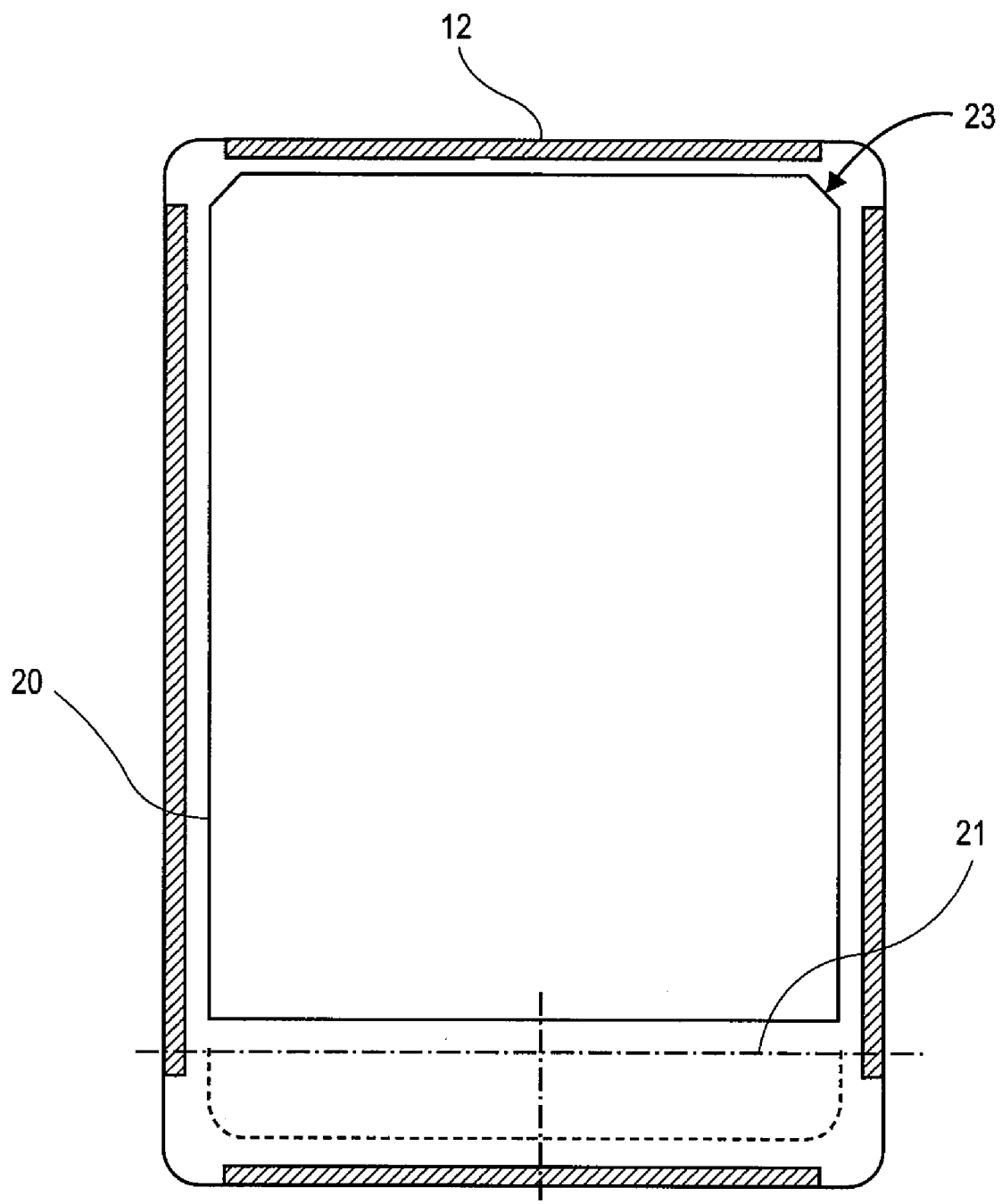
FIG. 3 is a top orthogonal view of a handheld device protective case depicting the external hard shell layer with cut corners and inner elastomeric layer of the protective carrying case where is fills in the cut corners of the external hard shell layer and an additional large elastomeric overhand for securing a device.
Figure 5:
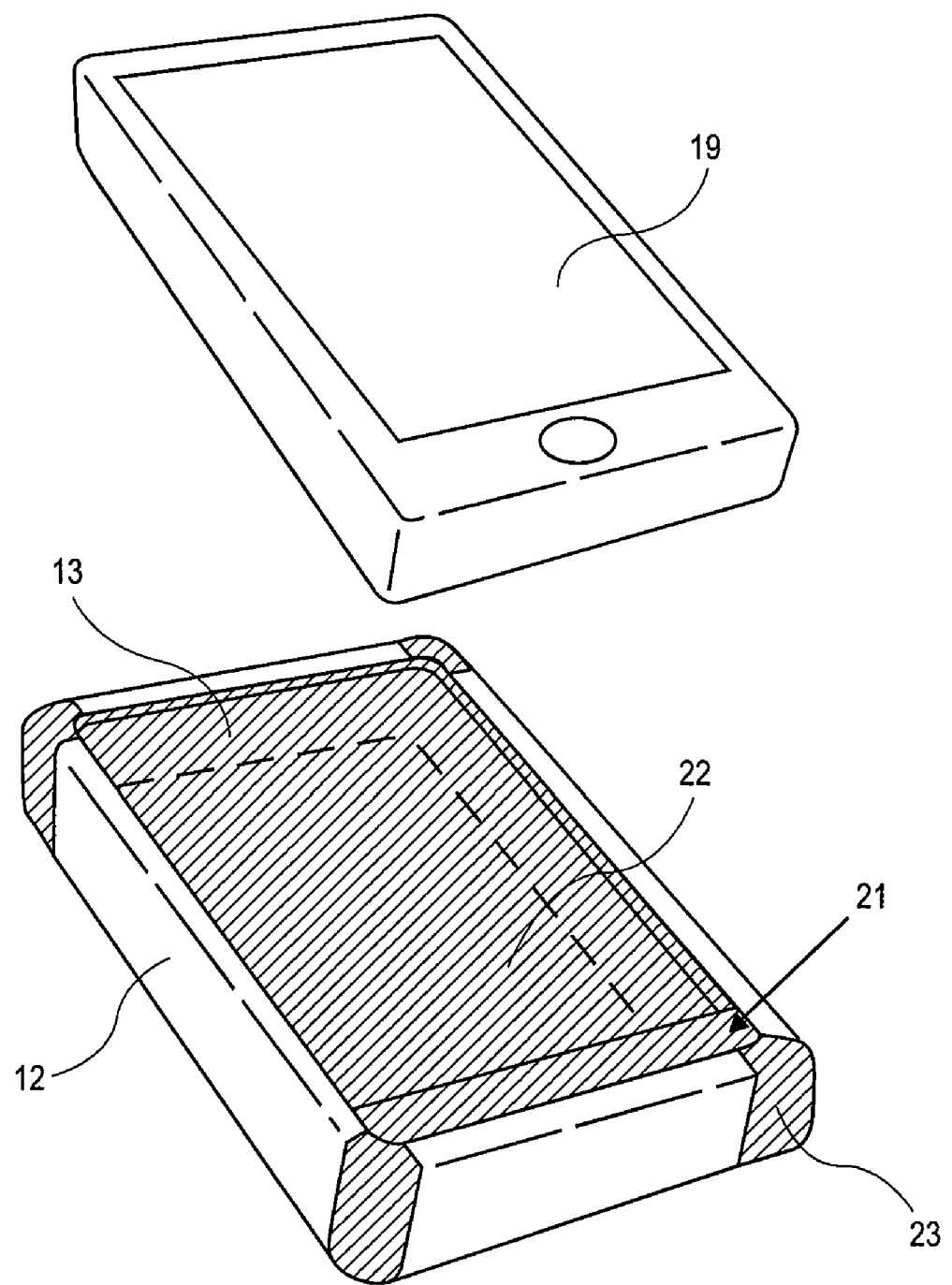
FIG. 5 is a perspective view of the protective case of the present invention before a device is secured therein.

As shown in FIGS. 3 and 5, the external hard shell layer 12 defines a fitted cavity 22 fitted to clasp onto a device 19 and incorporates a detent 20 to ensure a snug and secure fit. The handheld device 19 protective case depicts the external hard shell layer 12 with cut corners 23 and inner elastomeric layer 13 of the protective carrying case where the inner elastomeric layer 13 fills in the cut corners 23 of the external hard shell layer 12.

What makes this case different is the geometry and manufacturing of the case. The external hard shell layer 12 is formed to fit a device 19 closely with a small offset from the devices surface. The external hard shell layer 12 raps around the edges of a device 19 it is formed for. To allow the external hard shell layer 12 to be able to be mounted on a device 19 the corners 23 of the external hard shell layer 12 are cut open. This allows each sidewall of the external hard shell layer 12 to flex away when a device 19 is inserted and snap back once it is in place. The unique aspect of the protective case 10 is that an inner elastomeric layer 13 is formed in addition to the external hard shell layer 12 on the interior of the external hard shell layer 12. The inner elastomeric layer 13 fills in the gaps created at the corners 23 of the external hard shell layer 12 to allow the external hard shell layer 12 to flex during mounting as shown in FIGS. 7a and 7b.

Figure 7A:
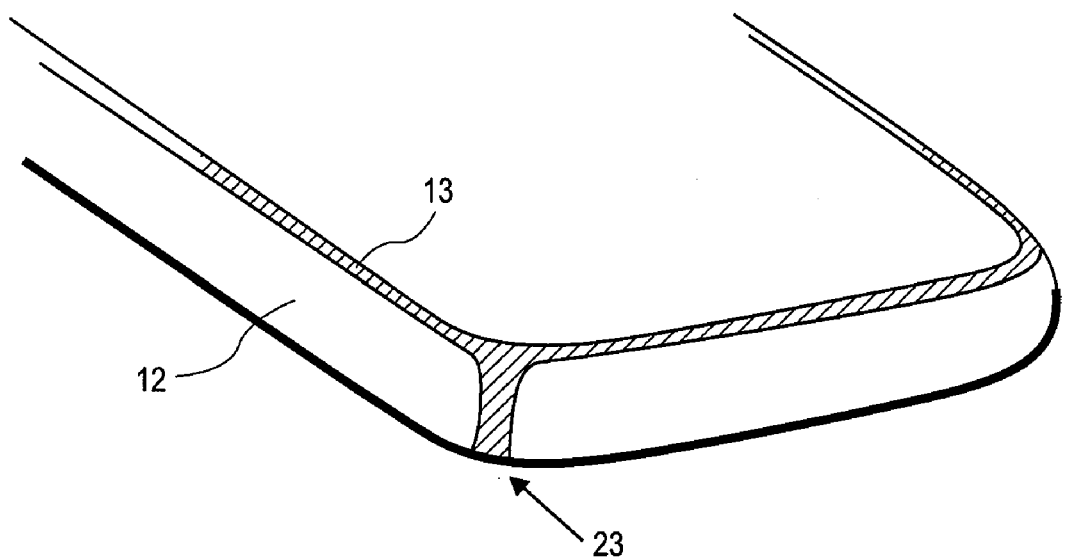
FIGS. 7a and 7b are perspective views of the present invention depicting the external hard shell layer with cut corners and inner elastomeric layer of the protective carrying case is a resting, securing position and in an expanded, device insertion position.
Figure 7B:
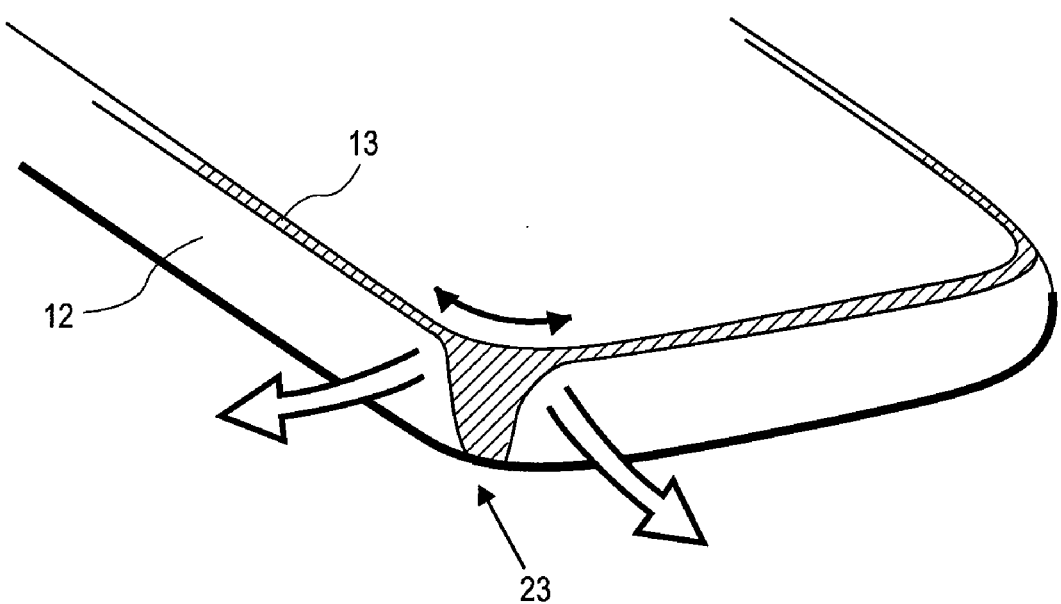

The inner elastomeric layer 13 is provided in this location because it has much greater inherent flexibility than the plastic or metal of the external hard shell layer 12 and it stretches sufficiently to allow the sidewalls of the external hard shell layer 12 to still flex away on mounting as shown in FIGS. 7a and 7b. This creates a one-piece protective case 10 that wraps around a device even on corners and prevents dirt and fluids from entering wherever possible.

The inner elastomeric layer 13 also can be formed over the buttons on a device 19 wherein a user simply presses the exposed inner elastomeric layer 13 corresponding to the portion of the mobile electronic device input that is desired as illustrated by the button 18 and 26 on FIG. 1. FIGS. 7a and 7b are perspective views of the present invention depicting the external hard shell layer 12 with cut corners 23 and inner elastomeric layer 13 of the protective carrying case 10 is a resting, securing position 24 and in an expanded, device insertion position 25.

It is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

What is claimed is:

1. A one-piece case for enclosing a personal electronic device comprising:
   a flexible inner layer co-molded with an exterior hard layer and permanently affixed together to form a co-molded one-piece assembly;
   wherein the co-molded one-piece assembly is sufficiently flexible to accept insertion of the personal electronic device and sufficiently rigid to securely retain the inserted personal electronic device, wherein:
   the flexible inner layer includes a bottom surface, side surfaces joined to the bottom surface and extending upward therefrom, and a fitted cavity configured to accept and retain the inserted personal electronic device such that the bottom surface covers at least a portion of a bottom surface of the inserted personal electronic device and the side surfaces cover at least a portion of a side surface of the inserted personal electronic device;
   the exterior hard layer includes a bottom surface and side surfaces sized and shaped to substantially cover an exterior of the bottom and side surfaces of the flexible inner layer and a cut away portion that is permanently filled with a portion of the co-molded flexible inner layer.

2. The one-piece case of claim 1, wherein the cut-away portion forms an expansion portion in the co-molded one-piece assembly that contributes to the overall flexibility of the co-molded one-piece assembly.

3. The one-piece case of claim 1, wherein the flexible inner layer of the co-molded one-piece assembly provides shock protection for the enclosed personal electronic device.

4. The one-piece case of claim 1, wherein the side surfaces of the exterior hard layer form a corner joint and the co-molded flexible inner layer fills in the cut-away portion located at the corner joint contributing to the overall flexibility of the one-piece case.

5. The one-piece case of claim 1, wherein the flexible inner layer that fills in the cut-away portion creates a stretch-zone that is sufficiently flexible to enable the co-molded one-piece assembly to deform and thereby accept insertion of the personal electronic device.

6. The one-piece case of claim 1, wherein the exterior hard layer includes at least four side surfaces that intersect to form at least four corner joints and two of the corner joints comprise cut-away portions that expose the co-molded flexible inner layer.

7. The one-piece case of claim 1, wherein the co-molded one-piece assembly includes an overhang extending from a top portion of one or more of the side surfaces in parallel to the bottom surface of the one-piece case.

8. The one-piece case of claim 1, further comprising:
   an opening parallel to the bottom surface of the flexible inner layer positioned such that a portion of the inserted personal electronic device is not enclosed by the co-molded one-piece assembly.

9. The case of claim 8, wherein an overhang extending from a top portion of one or more of the side surfaces and extends completely around the perimeter of the opening.

10. The one-piece case of claim 1, further comprising:
    an aperture sized and positioned to align with a feature of the inserted personal electronic device and thereby enable access to the feature.

11. The one-piece case of claim 1, wherein the side surfaces of at least one of the flexible inner layer and the exterior hard layer extend above a top surface of the inserted personal electronic device.

12. The one-piece case of claim 1, wherein the flexible inner layer is manufactured from at least one of rubber, silicon, plastic, or fabric.

13. The one-piece case of claim 1, wherein the exterior hard layer is manufactured from at least one of plastic, metal, a polycarbonate material, or a para-aramid material.

14. The case of claim 1 wherein the co-molded one-piece assembly comprises a plurality of radiused corners and a plurality of cut-away portions and wherein each of the plurality of radiused corners contains one of the plurality of cut-away portions.

15. The one-piece case of claim 1, wherein the exterior hard layer includes at least two side surfaces that form a radiused corner and the cut-away portion is located at substantially the bisector of the radiused corner.

16. The case of claim 1 wherein the cut-away portion that is permanently filled with a portion of the flexible inner layer, extends through at least the side surface and a portion of the bottom surface of the exterior hard layer.

* * * * *